United States Patent [19]
Karol

[11] Patent Number: 5,740,026
[45] Date of Patent: Apr. 14, 1998

[54] CONTROLLED INPUT CIRCUIT FOR AN SCR TO ACCEPT EITHER AC OR DC VOLTAGE

[75] Inventor: Gregory Michael Karol, Norton, Mass.

[73] Assignee: The Foxboro Company, Foxboro, Mass.

[21] Appl. No.: 716,982

[22] Filed: Sep. 20, 1996

[51] Int. Cl.[6] .......................... H02M 5/42; H02M 1/10
[52] U.S. Cl. .......................................... 363/86; 363/142
[58] Field of Search .............................. 363/86, 142, 89, 363/124, 126; 323/282, 187

[56] References Cited

U.S. PATENT DOCUMENTS

| | | | |
|---|---|---|---|
| 4,463,414 | 7/1984 | Landis | 363/86 |
| 4,855,892 | 8/1989 | Lower | 363/86 |
| 4,866,367 | 9/1989 | Ridley et al. | 323/287 |
| 5,495,164 | 2/1996 | Heng | 323/287 |

OTHER PUBLICATIONS

Prior Art Fan Power Circuit from I/A Series System from the Foxboro Company.

*Primary Examiner*—Peter S. Wong
*Assistant Examiner*—Bao Q. Vu
*Attorney, Agent, or Firm*—David Barron; Jules Jay Morris; Terrence Martin

[57] ABSTRACT

A power conditioning circuit for use in a power supply includes a power input and a power output. The circuit also includes a series connected RFI-EMI filter, rectifier, and SCR between the power input and the power output. The SCR has a control input for switching the SCR on and off, thereby interrupting current flow between the power input and the power output. An energy storage circuit is connected across the power output. Furthermore, the circuit includes a control circuit coupled to the control input of the SCR for switching the SCR on and off to maintain a regulated voltage at said power output in response to an AC input. A conditioned DC output is produced in response to a DC input.

19 Claims, 3 Drawing Sheets

CONTROLLED INPUT CIRCUIT FOR AN SCR TO ACCEPT EITHER AC OR DC VOLTAGE

TECHNICAL FIELD

The present invention relates, in general, to power supply circuits. In particular, the present invention relates to a high efficiency power supply circuit that accepts a polarity independent AC or DC input and outputs a conditioned DC voltage.

BACKGROUND OF THE INVENTION

Power supplies are essential to every electrical and electronic device in existence. Reliable and dependable delivery of power is fundamental to insuring the proper operation of equipment. Accordingly, many different types of power supplies exist for a variety of electrical and electronic devices.

In different environments, electronic equipment receives power from a variety of sources. For example, in an industrial environment, electronic equipment may receive power from a variety of in-plant sources. These may include, for example, AC and DC power sources of varying voltage level, polarity, and quality.

Power supplies for electronic equipment are tailored to the available source. For example, if an unregulated DC source is available, a power supply is designed to accept the particular DC source and derive the required power therefrom. However, this power supply would be incapable of accepting, for example, an AC input. Thus, different power supplies must be designed, stocked and distributed for products such that they may be adapted to different power-availability environments. This adds to product cost.

In further connection with, for example, DC-input power supplies, these are usually input polarity dependent. Therefore, an installer must be careful to properly attach the input power. This adds both time to the installation process, and a risk of improper installation.

An additional issue regarding power supplies is efficiency. It is desirable to convert as much input power as possible to output power, without losing any power to, for example, heat in the conversion process. One source of inefficiency in power supply circuits is switching devices. Circuits that use transistor-type switches suffer from a reduced efficiency due to their on-resistance.

As one example of a previous power supply circuit, a circuit used to drive a fan within the I/A Series system from The Foxboro Company of Foxboro, Mass., USA is shown in FIG. 1. This circuit uses an SCR to switch between a full-wave bridge and full-wave center-tapped transformer/rectifier configuration. However, the SCR is not mainly used to provide voltage regulation as this is provided by a conventional pass-transistor regulator circuit. Further, the circuit of FIG. 1 does not permit a variety of input sources because it relies on a center tapped transformer for proper operation. As is well known, DC does not pass through transformers.

In view of the above, it would be advantageous to have a power supply that could accept a polarity independent AC or DC source and provide a conditioned output or outputs therefrom. Furthermore, it would be advantageous to have a power supply circuit with increased efficiency.

The present invention is directed toward a solution to the above-described problems and objectives.

SUMMARY OF THE INVENTION

In a first aspect, the present invention includes a power supply circuit (e.g., used for power conditioning in power supplies) having a power input and a power output. The power supply circuit includes a rectifier circuit, an SCR and a control circuit. The rectifier circuit has an unrectified input and a rectified output. The unrectified input is coupled to the power input of the power supply circuit. The SCR has first and second current carrying terminals and a control input. In particular, the first current carrying terminal is coupled to the rectifier output and the second current carrying terminal is coupled to the power output. Accordingly, the SCR is configured to interrupt an electrical path from the power input to the power output.

The control circuit is coupled to the control input of the SCR and the power output, and is configured to send on and off control signals to the control input of the SCR in response to a voltage at the power output. The voltage at the power output is accordingly regulated when AC is applied to the power input. An energy storage circuit comprising multiple parallel connected capacitors may be connected across the power output. A conditioned DC output is produced in response to a DC input.

As an enhancement, the control circuit may include a comparator having a reference input, a monitor input and a control output. The reference input is coupled to a voltage reference, the monitor input is coupled to the power output and the control output is coupled to the control input of the SCR. The voltage reference may include a zener diode. Further, the control circuit may include a biasing circuit coupled to the control input of the SCR for biasing the control input of the SCR in an off state when the driver circuit is not energizing the control input of the SCR.

As a further enhancement, the control circuit may include a driver circuit between the control output of the comparator and the control input of the SCR. The driver circuit provides signal buffering and a low output impedance for driving the control input of the SCR. Further, the driver circuit may include a pair of transistors in a two-stage buffer configuration.

In further regard to the comparator, it may be powered by a positive power input coupled to a positive end of the power output. To protect the comparator from an overvoltage supply condition that could damage the comparator, a zener diode may be coupled between the positive power input of the comparator and a ground.

Further enhancements to the power supply circuit provide signal conditioning and filtering. In particular, an RFI-EMI suppression circuit (e.g., a series connected RC circuit) may be connected across the current carrying terminals of the SCR. An RFI-EMI filter may be coupled between the power input and the input of the rectifier. This RFI-EMI filter may include a common mode inductor and at least one capacitor connected across the power input for differential mode rejection and at least one capacitor connected between one end of the power input and an earth ground for common mode noise filtering. Also, a transient suppression circuit may be connected across the power input.

The circuit of the present invention advantageously provides a conditioned voltage output in response to a variety of power inputs. Furthermore, and in accordance with the present invention, the power conditioning circuit described herein can be combined with a voltage regulator (e.g., a multi-voltage DC to DC converter circuit) to form a complete power supply. The complete power supply is capable of accepting a wide range of polarity independent AC or DC inputs and producing multiple regulated DC outputs. The need for different product models and/or different power supplies for a variety of environments (e.g., industrial environments) is accordingly obviated.

BRIEF DESCRIPTION OF THE DRAWINGS

The subject matter regarded as the present invention is particularly pointed out and distinctly claimed in the concluding portion of the specification. The invention, however, both as to organization and method of practice, together with further objects and advantages thereof, may best be understood by reference to the following detailed description taken in conjunction with the accompanying drawings in which:

DETAILED DESCRIPTION OF A PREFERRED EMBODIMENT

Figure 1:
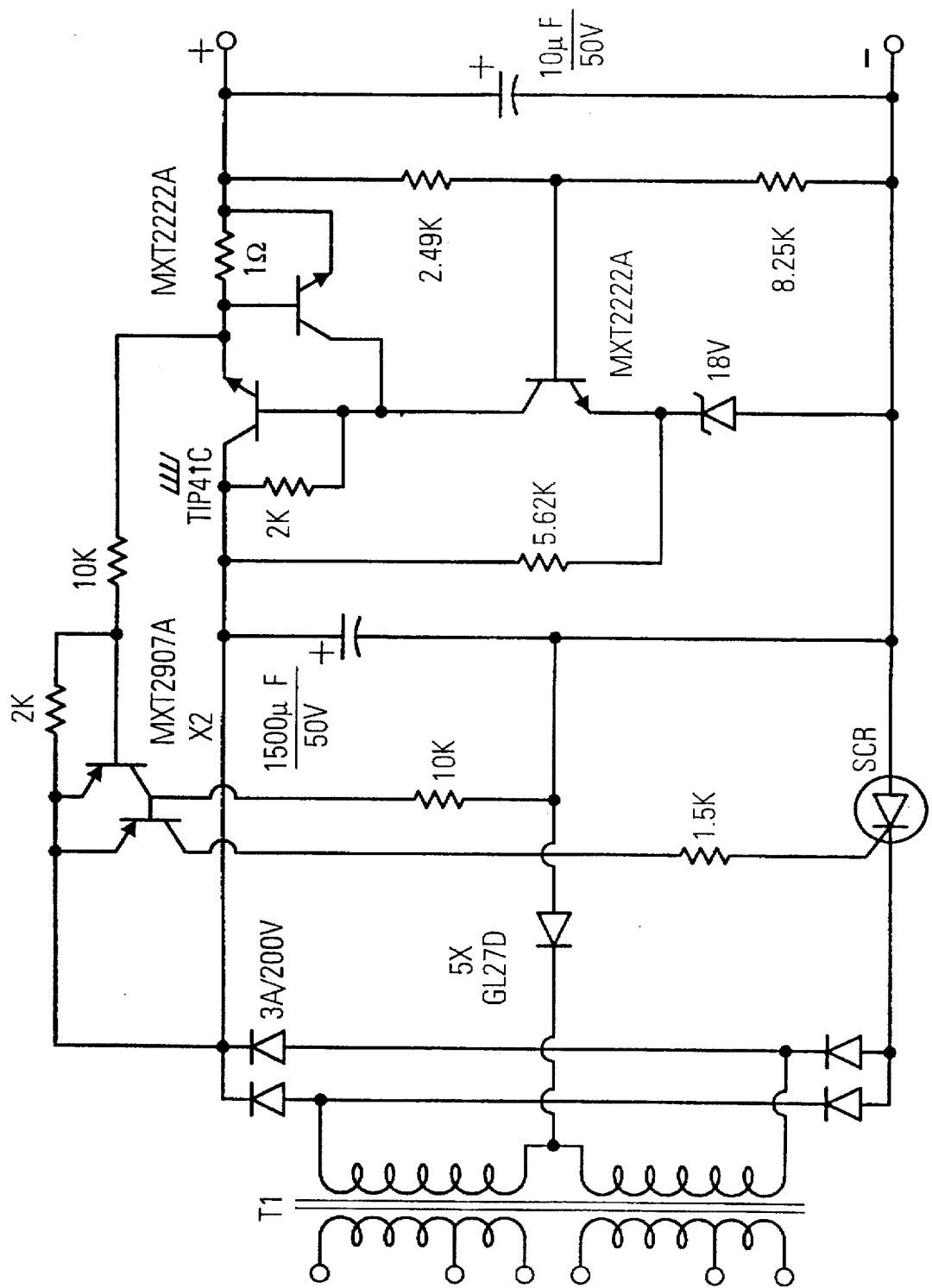
FIG. 1 is a schematic of a prior art power supply.
Figure 2:
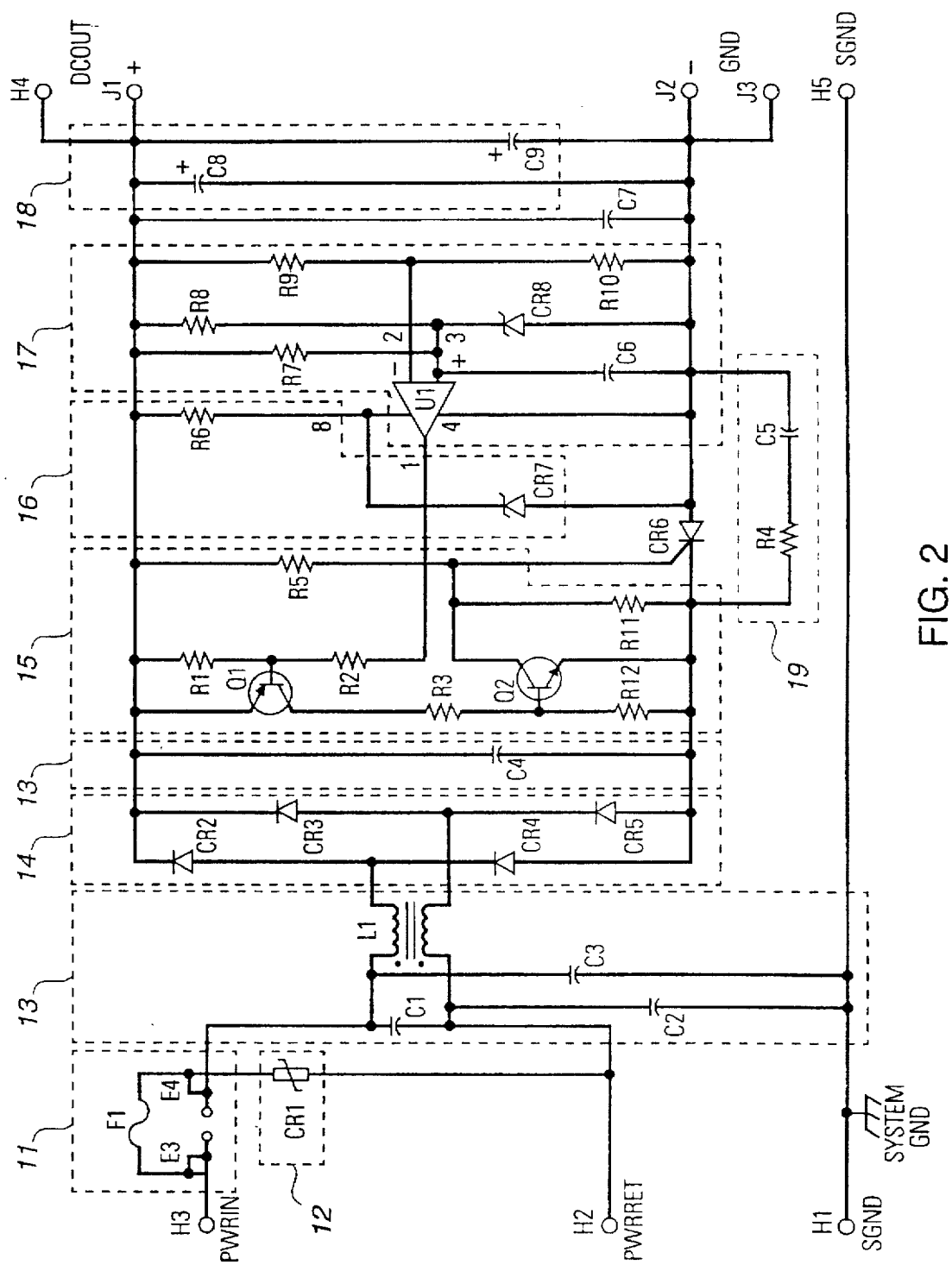
FIG. 2 is a schematic of a power conditioning circuit in accordance with one embodiment of the present invention.

Depicted in FIG. 2 is a power supply circuit according to the present invention. Turning to the circuit, power from an input source is presented to input nodes PWRIN and PWR-RET (that is, power-in and power-return, respectively). Power output from the circuit is provided at output nodes DCOUT and GND (i.e., DC power output and, e.g., an earth ground). A system ground, SGND, is also provided.

Current initially passes through a safety circuit 11 that includes a fuse, F1, which provides overcurrent protection. A transient surge suppresser circuit 12 is connected across the power input and protects the circuit from power spikes (for example, caused by lightning and inductive load switching). In the current embodiment, transient surge suppression circuit 12 includes a transient surge suppresser CR1.

Power is next passed through an RFI-EMI ("Radio Frequency Interference—Electro-Magnetic Interference") emissions filter 13. This filter is bi-directional, and prevents noise from passing between the power input and the remainder of the power supply circuit. Within RFI-EMI emissions filter 13 is a capacitor C1 that is connected across the power input and filters differential mode noise. From each end of the fused power input to ground is a capacitor (C2 and C3) that filters common mode noise. A common mode inductor, L1, is series connected to the next circuit stage and provides further common mode rejection. Lastly, a capacitor C4 provides additional differential mode rejection.

The next circuit stage is a rectifier 14. Four diodes (CR2-CR5) in a full-wave configuration provide AC to DC conversion for an AC power input. If the power input is DC, rectifier 14 assures a known polarity at the output thereof.

An SCR CR6 is series connected between the output of rectifier 14 and the power output of the power supply circuit. SCR CR6 switches on and off such that the power output is maintained at a regulated voltage (during AC operation). Since the on-resistance of SCRs are typically low (for example, 0.25 ohms), switching is performed with high efficiency. SCR CR6 is series connected between the power input and power output by way of its current carrying terminals (anode and cathode). The current carrying terminals are also parallel connected to an RFI-EMI suppression filter 19 formed from series connected resistor R4 and capacitor C5. Lastly, the switching of SCR CR6 is controlled by its control input (that is, its gate).

The control input of SCR CR6 is driven by a series connected combination of a control circuit 17 and a driver circuit 15. Control circuit 17 includes a comparator U1 that is configured to compare the voltage of the power output with a voltage reference. The output of comparator U1 is high if the output voltage is lower than the voltage reference, and is low if the output voltage is higher than the voltage reference.

More particularly, the positive input of comparator U1 is connected to the center node of a voltage reference circuit. A first leg of the voltage reference circuit is a pair of parallel connected resistors (R7 & R8) that connect the positive input of U1 to DCOUT (parallel resistors R7 & R8 are used for increased power dissipation; a single, higher power resistor could be substituted if available). A second leg of the voltage reference circuit connects the positive input of U1 to GND through a zener diode (CR8). The negative input of comparator U1 is connected to the midpoint of a voltage divider formed from resistors R9 and R10 that are series connected between DCOUT and GND. The values of CR8, R9 and R10 are chosen such that the output of U1 changes state at the desired output voltage of the power output.

Comparator U1 is powered by the voltage potential between DCOUT and GND. It is possible that this voltage potential could exceed a maximum voltage rating for U1. Therefore, an overvoltage protection circuit 16 is included. In particular, a positive supply voltage input of U1 is connected to DCOUT by a resistor R6, and is connected to GND by a zener diode CR7. The values of R6 and CR7 are chosen such that the supply voltage limit of U1 can not be exceeded.

As discussed above, driver circuit 15 couples the output of control circuit 17 to the control input of SCR CR6. Driver circuit 15 includes a two-stage buffer circuit, and is configured to drive the gate of SCR CR6 using a low-impedance output. This insures that SCR CR6 will reliably turn on and off in response to control circuit 17.

Driver circuit 15 passes the output of U1 through a voltage divider (formed from series connected resistors R2 and R1) to DCOUT. The center node of the R2–R1 voltage divider provides biasing for, and is connected to, the base of a PNP transistor Q1. The emitter of Q1 is connected to DCOUT and the collector of Q1 is connected through another voltage divider (formed from series connected resistors R3 and R12) to GND. The center node of the R3–R12 voltage divider provides biasing for, and is connected to, the base of an NPN transistor Q2. Transistor Q2's emitter is connected to GND, while its collector is connected to the gate of SCR CR6. The gate of CR6 is biased by a connection to the center node of a voltage divider formed from series connected resistors R5 and R11 between DCOUT and GND.

To complete the discussion of FIG. 2, regulation and filtering of the output voltage between DCOUT and GND is further facilitated by an energy storage and filtering circuit 18. This circuit maintains a voltage level during off-periods of CR6 and "charges-up" during on-periods of CR6. Energy storage circuit 18 includes both large capacitors (C8 and C9) for bulk energy storage and a smaller capacitor (C7) for higher frequency filtering.

Figure 3:
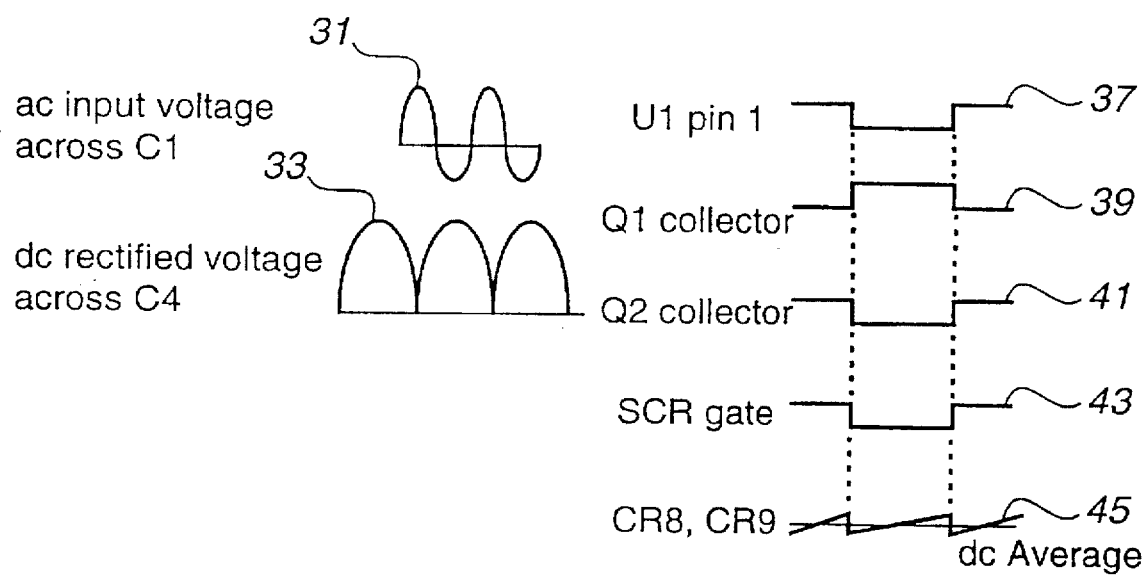
FIG. 3 depicts operational signals within the circuit of FIG. 2 pursuant to an embodiment of the present invention.

Discussed below is the operation of the circuit of FIG. 2 with both an AC and DC input. Throughout this discussion, reference will be made to the operational signals depicted in FIG. 3 in connection with two main operational states depicted therein.

The input voltage is passed through Transient Suppresser CR1, where lightning and high energy noise signals are clipped. The input line voltage is filtered by common mode inductor L1, differential mode capacitors C1 and C4, and common mode filter capacitors C2 and C3. This filter prevents noise generated by the SCR circuitry from passing onto the input power line. This circuit also filters the incoming line voltage. The line voltage is then rectified by diodes CR2 through CR5. Trace 31 depicts the signal across C1, prior to rectification. Trace 33 depicts an AC signal across C4, after full-wave rectification.

During AC operation, at initial power up, dynamic state 1 is entered. In particular, at time t=0 seconds, the initial voltage at the DC output across bulk energy storage capacitors C8 and C9 is zero volts. Voltage at diode CR8 rises to the voltage level at the junction of resistors R7 and R8. Thus, comparator U1's initial output is at a logic high level (trace 37). This causes the base of transistor Q1 to be at R1's (high) potential. The collector of transistor Q1 (trace 39) is therefore at a low potential (non-conduction). The base drive current to transistor Q2 is accordingly near zero, forcing its collector to be at a low potential (non-conduction—trace 41). This causes voltage divider resistors R5 and R11 to apply a gate drive voltage to SCR CR6 (trace 43). Resistors R5 and R11 also insure that the gate voltage of SCR CR6 does not exceed its component rated limit. SCR CR6 conducts for successive positive half cycles charging up electrolytic capacitor bank C8 and C9 (trace 45). This action continues until sufficient voltage is built up at the junction of resistors R9 and R10 to cause the output of comparator U1 to go low. We now go into "state 2" discussed below.

In state 2, the output of comparator U1 goes low (trace 37) and causes the base of transistor Q1 to draw base drive current through resistor R2. This causes transistor Q1's collector to conduct (trace 39), pulling up to the input voltage. This causes current to flow through resistor R3 and supplies base drive current to transistor Q2. This action causes the collector of transistor Q2 to turn on (trace 41), forcing the gate voltage that was applied to SCR CR6 to go to zero volts (trace 43). This action turns off SCR CR6 when the rectified AC waveform applied to its anode crosses zero. SCR CR6 remains off until the voltage at the junction of resistors R9 and R10 starts to drop below the reference voltage of zener diode CR8 (trace 45). When this happens, the output of comparator U1 goes high causing the circuit to repeat State 1.

The circuit switches repetatively between states 1 and 2. This repetative action causes the resultant voltage that appears across capacitors C8 and C9 to be charged at a DC average voltage value regulated at the desired output voltage. Resistor R4 and capacitor C5 provide RFI/EMI filtering to suppress conducted and radiated noise on SCR CR6.

During DC operation, the above discussion through state 2 applies (through the point in time at which sufficient voltage is built up at the junction of resistors R9 and R10 to cause the output of comparator U1 to go low). However, since this is a DC input application, the SCR remains on and provides DC input minus two rectifier diode drops (e.g., 1.5 VDC) along with the SCR voltage drop (e.g., 0.5 VDC). Total series output voltage drop is therefore approximately 2.0 VDC making the output voltage approximately 2.0 VDC below the input voltage.

Upon a DC power loss, energy storage capacitors C8 and C9 supply power to the power output. In the event of a longer input power outage, SCR CR6 resets and awaits restoration of input power. Upon the reestablishment of input power, resistors R5 and R11 supply power to enable SCR CR6 to turn on and to remain on. DC glitches on the power input are filtered by C1, C4, L1 and C7. Also, transient suppresser CR1 provides input voltage clamping of transient energy.

The individual values of the various components discussed herein will vary according to, for example, input and output voltage and power requirements. However, in one embodiment having an input voltage range of 9.8–33 volts DC (up to 84 Vp-p AC), and an output of 24 volts (AC) at up to 3 amps, the following component values are used.

| Component Name | Value/Description |
| --- | --- |
| F1 | Fuse, 3.5 amp, slo-blow |
| CR1 | Varistor, Harris V56CH8, 35 Vrms, 45 VDC |
| CR2, CR3, CR4, CR5 | Rectifier 3A |
| CR6 | SCR, Motorola MCR703A |
| CR7 | Zener Diode, 12 V, 600 mw |
| CR8 | Zener Diode, 5.1 V, 600 mw |
| C1, C4 | Capacitor, ceramic, 0.22 uf, 200 v |
| C2, C3 | Capacitor, ceramic, 1500 pf, 1 kv |
| L1 | Inductor, common-mode, 1 mH |
| C5 | Capacitor, ceramic, 0.01 uf, 100 v |
| C6, C7 | Capacitor, ceramic, 0.01 uf, 50 v |
| C8, C9 | Capacitor, electrolytic, 2200 uf, 50 VDC |
| U1 | Comparator, LM393D |
| Q1 | Transistor, PNP, MMBT2907A |
| Q2 | Transistor, NPN, MMBT2222A |
| R1 | Resistor, 30.1 k |
| R2, R3, R11 | Resistor, 20 k |
| R4 | Resistor, 1 k |
| R5, R10 | Resistor, 10 k |
| R6 | Resistor, 2 k |
| R7, R8 | Resistor, 4 k |
| R9 | Resistor, 37.4 k |
| R12 | Resistor, 5.11 k |

Advantageously, and in accordance with the present invention, the power conditioning circuit described herein can be combined with a voltage regulator to form a complete power supply. Many DC input, polarity dependent voltage regulators are commonly available. These accept a fixed DC input range and product at least one regulated voltage output. As one example, a multi-voltage regulator using a MAXIM brand, model MAX782 DC to DC converter produces a 5 VDC and a 3.3 VDC output at up to 3 A each and a 12 VDC output at up to 200 ma. When the power input of this regulator is coupled to the power output of the power conditioning circuit described herein, a complete power supply results and is capable of accepting a wide range of polarity independent AC or DC inputs and producing multiple regulated DC outputs. The need for different product models and/or different power supplies for a variety of environments (e.g., industrial environments) is accordingly obviated.

While the invention has been described in detail herein, in accordance with certain preferred embodiments thereof, many modifications and changes thereto may be affected by those skilled in the art. Accordingly, it is intended by the appended claims to cover all such modifications and changes as fall within the true spirit and scope of the invention.

I claim:

1. A power supply circuit having a power input and a power output, said power supply circuit comprising:
   a rectifier circuit having an unrectified input and a rectified output, said unrectified input being coupled to said power input;
   an SCR having a first current carrying terminal, a second current carrying terminal and a control input, said first current carrying terminal being coupled to said rectifier output, said second current carrying terminal being coupled to said power output such that said SCR is configured to interrupt an electrical path from said power input to said power output; and a control circuit coupled to said control input of said SCR and said power output, said control circuit configured to send on and off control signals to said control input of said SCR in response to a voltage at said power output such that said voltage at said power output is a regulated DC voltage when AC is applied to said power input and an unregulated DC voltage when DC is applied to said power input.

2. The power supply circuit of claim 1, wherein said control circuit includes a comparator having a reference input, a monitor input and a control output, said reference input being coupled to a voltage reference, said monitor input being coupled to said power output and said control output being coupled to said control input of said SCR.

3. The power supply circuit of claim 2, wherein said voltage reference includes a zener diode.

4. The power supply circuit of claim 2, wherein said control circuit includes a driver circuit between said control output of said comparator and said control input of said SCR, said driver circuit providing signal buffering and a low output impedance for driving said control input of said SCR.

5. The power supply circuit of claim 4, wherein said driver circuit comprises a pair of transistors in a two-stage buffer configuration.

6. The power supply circuit of claim 4, wherein said control circuit further comprises a biasing circuit coupled to said control input of said SCR for biasing said control input of said SCR in an off state when said driver circuit is not energizing said control input of said SCR.

7. The power supply circuit of claim 2, wherein said comparator includes a positive power input coupled to a positive end of said power output, said power supply circuit further including a zener diode coupled between said positive power input of said comparator and a ground for limiting the maximum voltage at said positive power input of said comparator.

8. The power supply circuit of claim 1, further comprising an RFI-EMI suppression circuit connected across said current carrying terminals of said SCR.

9. The power supply circuit of claim 8, wherein said RFI-EMI suppression circuit comprises a series connected RC circuit.

10. The power supply circuit of claim 1, further comprising an energy storage circuit coupled across said power output.

11. The power supply circuit of claim 10, wherein said energy storage circuit comprises a plurality of parallel connected capacitors.

12. The power supply circuit of claim 1, further comprising an RFI-EMI filter coupled between said power input and said unrectified input of said rectifier.

13. The power supply circuit of claim 12, wherein said RFI-EMI filter comprises a common mode inductor and at least one capacitor connected across said power input for differential mode rejection and at least one capacitor connected between one end of said power input and an earth ground for common mode noise filtering.

14. The power supply circuit of claim 1, further comprising a transient suppression circuit connected across said power input.

15. The power supply circuit of claim 1, further comprising a multi-voltage DC to DC converter circuit coupled to said power output for producing a plurality of regulated supply voltages.

16. A power conditioning circuit having a power input and a power output, said power conditioning circuit comprising:

a series connected RFI-EMI filter, rectifier, and SCR between said power input and said power output, said SCR having a control input for switching said SCR on and off thereby interrupting current flow between said power input and said power output;

an energy storage circuit connected across said power output; and a control circuit coupled to said control input of said SCR for control thereof, and coupled to said power output for monitor thereof, said control circuit switching said SCR on and off to maintain a regulated DC voltage at said power output when AC is applied to said power input and to maintain an unregulated DC voltage at said power output when DC is applied to said power input.

17. A power conditioning circuit having a power input and a power output, said power conditioning circuit comprising:

a transient protection circuit connected across said power input;

a series connected RFI-EMI filter, rectifier, and SCR between said power input and said power output, said SCR having a control input for switching said SCR on and off thereby interrupting current flow between said power input and said power output;

an RFI-EMI suppression circuit connected across current carrying terminals of said SCR;

an energy storage circuit connected across said power output; and a control circuit coupled to said control input of said SCR for control thereof, and coupled to said power output for monitor thereof, said control circuit switching said SCR on and off to maintain a regulated DC voltage at said power output in response to AC at said power input, and an unregulated DC voltage at said power output when DC is applied to said power input, wherein said control circuit includes a comparator having a first input coupled to said power output, a second input coupled to a voltage reference and a control output coupled to said control input of said SCR through a driver circuit.

18. A power supply circuit having a power input and a power output, said power supply circuit comprising:

a rectifier circuit having an unrectified input and a rectified output, said unrectified input being coupled to said power input;

an SCR having a first current carrying terminal, a second current carrying terminal and a control input, said first current carrying terminal being coupled to said rectifier output, said second current carrying terminal being coupled to said power output such that said SCR is configured to interrupt an electrical path from said power input to said power output;

an RFI-EMI suppression circuit connect across said current carrying terminal of said SCR; and a control circuit coupled to said control input of said SCR and said power output, said control circuit configured to send on and off control signals to said control input of said SCR in response to a voltage at said power output such that said voltage at said power output is a regulated DC voltage when AC is applied to said power input and an unregulated DC voltage when DC is applied to said power input.

19. A power supply circuit having a power input and a power output, said power supply circuit comprising:

a rectifier circuit having an unrectified input and a rectified output, said unrectified input being coupled to said power input;

an SCR having a first current carrying terminal, a second current carrying terminal and a control input, said first current carrying terminal being coupled to said rectifier output, said second current carrying terminal being coupled to said power output such that said SCR is configured to interrupt an electrical path from said power input to said power output;

a RFI-EMI filter coupled between said power input and said unrectified input of said rectifier, wherein said RFI-EMI filter comprises a common mode inductor and at least on capacitor connection across said power input for differential mode rejection and at least one capacitor connected between one end of said power input and an earth ground for common mode noise filtering; and a control circuit coupled to said control input of said SCR and said power output, said control circuit configured to send on and off control signals to said control input of said SCR in response to a voltage at said power output such that said voltage at said power output is a regulated DC voltage when AC is applied to said power input and an unregulated DC voltage when DC is applied to said power input.

* * * * *